US009817144B2

(12) United States Patent
Lambert

(10) Patent No.: US 9,817,144 B2
(45) Date of Patent: Nov. 14, 2017

(54) SMART STREAMER RECOVERY DEVICE

(71) Applicant: ION Geophysical Corporation, Houston, TX (US)

(72) Inventor: Dale J. Lambert, Mandeville, LA (US)

(73) Assignee: ION GEOPHYSICAL CORPORATION, Houston, TX (US)

(*) Notice: Subject to any disclaimer, the term of this patent is extended or adjusted under 35 U.S.C. 154(b) by 0 days.

(21) Appl. No.: 15/170,684

(22) Filed: Jun. 1, 2016

(65) Prior Publication Data
US 2016/0349393 A1 Dec. 1, 2016

Related U.S. Application Data

(60) Provisional application No. 62/169,262, filed on Jun. 1, 2015.

(51) Int. Cl.
G01V 1/38 (2006.01)
F16L 1/12 (2006.01)
F16L 1/24 (2006.01)
B63B 21/66 (2006.01)
G01V 1/20 (2006.01)

(52) U.S. Cl.
CPC ............ *G01V 1/3843* (2013.01); *B63B 21/66* (2013.01); *F16L 1/126* (2013.01); *F16L 1/24* (2013.01); *G01V 1/201* (2013.01); *G01V 1/38* (2013.01); *G01V 2001/207* (2013.01)

(58) Field of Classification Search
CPC ...... G01V 1/38; G01V 1/3826; G01V 1/3817; G01V 1/3843
See application file for complete search history.

(56) References Cited

U.S. PATENT DOCUMENTS

| | | | |
|---|---|---|---|
| 3,673,556 A | 6/1972 | Biggs | |
| 4,033,278 A | 7/1977 | Waters et al. | |
| 4,375,089 A * | 2/1983 | Thigpen | G01V 1/3835 367/106 |
| 4,541,079 A * | 9/1985 | Thigpen | G01V 1/38 114/245 |
| 4,583,206 A | 4/1986 | Rialan et al. | |
| 4,635,237 A | 1/1987 | Benestad et al. | |
| 4,745,583 A * | 5/1988 | Motal | G01V 1/3826 114/245 |
| 4,823,325 A * | 4/1989 | Cole, Jr. | G01V 1/201 114/245 |
| 4,928,262 A | 5/1990 | Neeley et al. | |
| 5,404,339 A | 4/1995 | Cole, Jr. | |
| 6,142,092 A * | 11/2000 | Coupland | B63B 22/18 114/331 |

(Continued)

FOREIGN PATENT DOCUMENTS

WO 2011014071 A2 2/2011

OTHER PUBLICATIONS

The International Search Report and Written Opinion dated Aug. 11, 2016 in connection with International Patent Application No. PCT/US2016/036324, 13 pages.

*Primary Examiner* — Frederick L Lagman
(74) *Attorney, Agent, or Firm* — Dorsey & Whitney LLP

(57) ABSTRACT

Systems and methods are provided for operating streamer recovery devices to retrieve seismic streamers, for example streamers that become severed from their towing vessels. The streamer recovery can be remotely activated to cause the streamer to surface where the streamer is more easily retrieved.

26 Claims, 3 Drawing Sheets

(56) References Cited

U.S. PATENT DOCUMENTS

| | | | |
|---|---|---|---|
| 6,932,017 | B1 | 8/2005 | Bittleston et al. |
| 7,701,803 | B2 | 4/2010 | Welker et al. |
| 9,290,239 | B2 | 3/2016 | Rinnan |
| 2003/0045189 | A1* | 3/2003 | Cole, Jr. .................. B63C 7/10 |
| | | | 441/133 |
| 2006/0227657 | A1 | 10/2006 | Tveide et al. |
| 2008/0008032 | A1 | 1/2008 | Welker et al. |
| 2008/0025146 | A1 | 1/2008 | Welker et al. |
| 2013/0213291 | A1 | 8/2013 | Rinnan |
| 2013/0309017 | A1* | 11/2013 | Stenzel .................. B63B 21/66 |
| | | | 405/171 |
| 2014/0241122 | A1 | 8/2014 | Ponceau et al. |
| 2015/0133012 | A1* | 5/2015 | Stenzel .................... B63C 7/26 |
| | | | 441/133 |
| 2015/0232155 | A1* | 8/2015 | Roger .................... B63B 22/22 |
| | | | 114/245 |
| 2016/0018546 | A1* | 1/2016 | Eick .................... G01V 1/3808 |
| | | | 367/24 |

\* cited by examiner

SMART STREAMER RECOVERY DEVICE

CROSS-REFERENCE TO RELATED APPLICATIONS

This application claims priority to U.S. provisional application No. 62/169,262, entitled "Smart Streamer Recovery Device," filed Jun. 1, 2015, which is incorporated by reference herein, in the entirety and for all purposes.

FIELD

The present invention relates to systems for locating and retrieving marine seismic streamers which become severed from the towing vessel. More particularly, the invention relates to floatable systems which lift marine streamers to the surface where they can be recovered.

BACKGROUND

Offshore data acquisition for well and gas exploration is generally performed by means of vessels which pull seismic streamers below the surface of the water. These marine seismic streamers are generally 3000 to 15000 meters in length and are towed at a depth of about 20 to 60 feet. The streamers include hundreds of hydrophones or other seismic sensors which detect seismic waves that are reflected from a shallow sound source, through the sub-bottom layers, and back up to the hydrophones. These waves are then transmitted to the towing vessel through the streamer where they can be processed to obtain information concerning underwater formations.

Remote controlled cable levelers (or bird devices) are often attached to a streamer to keep the streamer level and to control its depth. These levelers include wings which can be adjusted to cause the streamer to rise or dive as it is pulled through the water. Generally 10 to 15 cable levelers are needed to maintain adequate control of the streamer.

Remote controlled compasses are also secured at various locations along the length of the streamer to provide a means for determining the position of the streamer. These compasses transmit heading data back to the seismic vessel where it can be utilized to calculate the position of the streamer.

The streamer, cable levelers, and compasses comprise expensive pieces of electronic equipment. The cost of a single streamer can be in the hundreds of thousands of dollars. Seismic streamers are frequently torn into pieces or are pulled entirely from the seismic vessel by obstructions in the water such as oil and gas rigs, crab pots, fishing lines, etc. Because of the high cost of the streamers, it is highly desirable to retrieve severed streamers so that they may be repaired and reused.

Seismic streamers are generally filled with a light oil, gel or solid ballast material to provide neutral buoyancy along the length of the streamer. Accordingly, when a streamer is severed from the towing vessel, it does not readily rise to the surface nor sink to the bottom. Rather, the streamer gradually changes depth depending upon the salinity of the water and any currents. Thus, the momentum of the cable from being towed and ocean currents can carry the streamer for significant distances with its depth changing only gradually or in some circumstances changing significantly. Thus, it is extremely difficult to locate the position of a severed streamer.

The current procedures which are utilized to retrieve marine seismic streamers are generally unsatisfactory. While it is possible to put transmitters in a streamer to provide a means for locating the streamer once it is severed, it is still difficult to retrieve the streamer from the water. It is necessary for a diver to physically locate the streamer and to attach some type of cable or floatation device to bring the streamer to the surface.

SUMMARY

In view of the foregoing it is apparent that it would be a significant advancement in the art to provide a system and method for retrieving seismic streamers which become severed from their towing vessels which could be remotely activated to cause the streamer to surface where it could more easily be retrieved. Such a system is disclosed and claimed herein.

BRIEF DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Some embodiments of the invention are implemented via program code for execution on a computerized system. The program modules or algorithms or the program product define functions of the embodiments (including the methods described herein), and can be contained on a variety of non-transitory computer-readable media. Illustrative computer-readable media include, but are not limited to: (i) information permanently stored on non-rewritable storage media, e.g., read-only memory devices within a computer, CD-ROM disks or write-once-read many (WORM) drives readable by suitable drive system; (ii) alterable information stored on rewritable storage media, e.g., magnetic disks within a hard disk or removable drive system, erasable/programmable devices and flash memory; and (iii) information stored on such media and conveyed to a computer system by a communications medium, such as through a wired or wireless network. The latter embodiment specifically includes information downloaded from the Internet and other (e.g., cloud-based) networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

DETAILED DESCRIPTION

Figure 1:
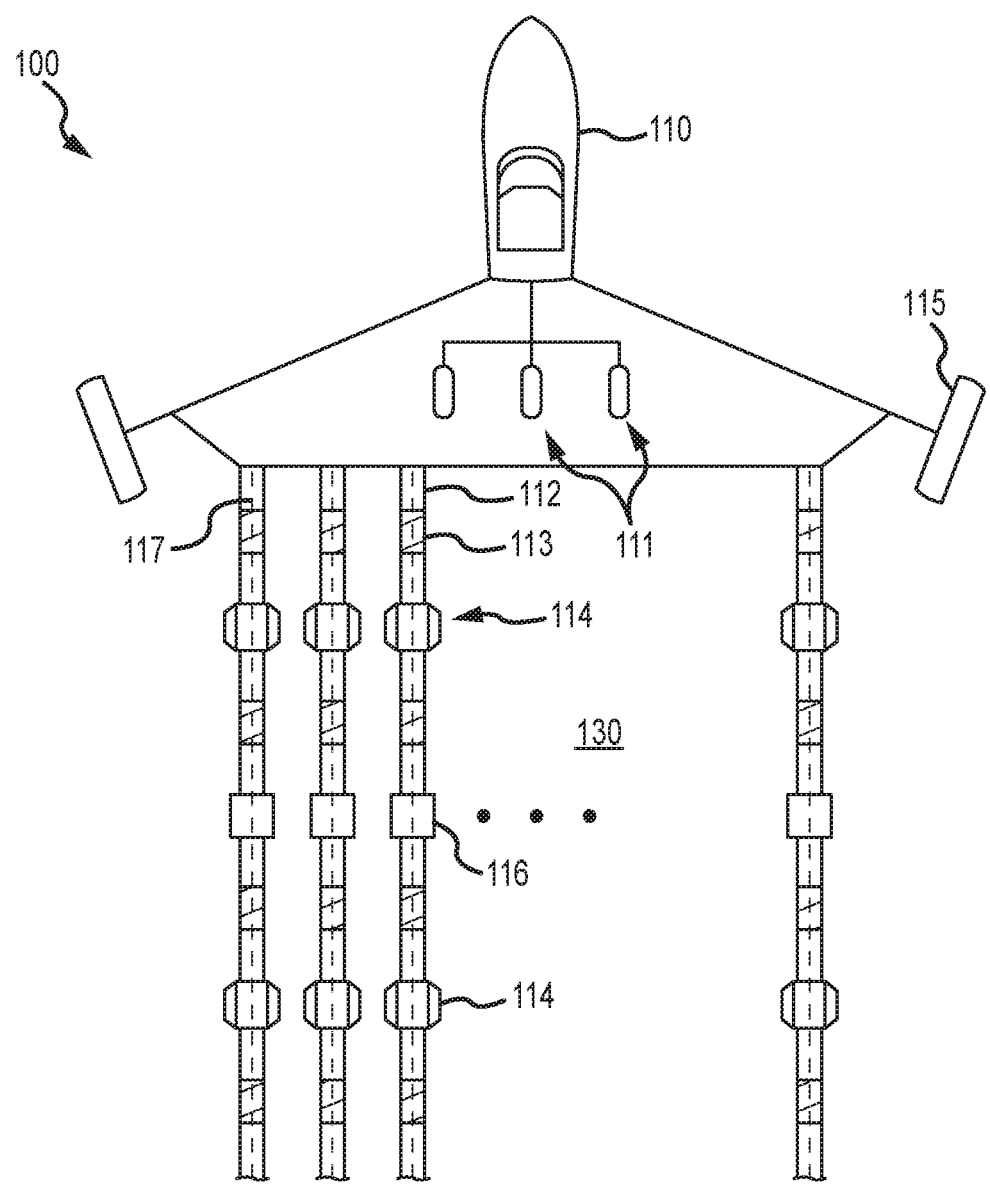
FIG. 1 illustrates an exemplary seismic survey according to an embodiment of the invention.

FIG. 1 illustrates an exemplary seismic survey system or apparatus 100 according to an embodiment of the invention. As illustrated, a seismic vessel 110 may tow one or more seismic sources 111 and one or more streamers or streamer cables 112. Each streamer cable 112 may include a plurality of seismic sensors 113. Exemplary seismic sensors include any one or more of, or combinations of, hydrophones, geophones, particle motion sensors such as accelerometers, and the like.

In one embodiment, one or more steering devices or depth controllers 114 may be coupled to each of the cables 112. The steering devices may be configured to control depth and/or lateral position of a respective cable such that an acceptable shape of the streamer cable array is maintained. To facilitate this, the steering/depth control devices 114 may be equipped with one or more of wings and/or fins that may be controllable to steer portions of respective streamers and adjust the shape of the streamer array. FIG. 1 also illustrates diverters (or paravanes) 115. The diverters 115 may cause the streamer cable array to spread when towed such that an acceptable distance is maintained between the streamer cables 112.

The seismic source 111 may be an air gun configured to release a blast of compressed air into the water column towards the seabed 130. A blast of compressed air from the air gun 111 generates seismic waves which may travel down towards the seabed 130, and penetrate and/or reflect from sub-seabed surfaces. The reflections from the sub-surfaces may be recorded by seismic sensors 113 as seismic data. The seismic data acquired via the seismic sensors 113 may be processed to develop an image of the sub-surface layers. These images may be analyzed by geologists to identify areas likely to include hydrocarbons or other substances of interest.

In one embodiment, each of the streamer cables 112 may also be equipped with one or more streamer recovery devices 116. The streamer recovery devices may cause the seismic streamers attached thereto, which are typically towed below the water surface during operations, to surface in case of a catastrophe. For example, if the streamer becomes detached from the vessel because it gets caught in an obstruction, or is cut by a passing vessel, etc., the streamer recovery devices may facilitate recovery of the expensive streamer along with its various attachments.

The streamer recovery devices generally include a cartridge of compressed gas, which may be activated to inflate a section of the streamer or a floatation device, thereby causing the streamer cable to surface and permit recovery. Conventional streamer recovery devices include a depth sensor, and are programmed to activate recovery when a predefined depth threshold is reached. However, in some cases, it may not be desirable to trigger a streamer recovery device simply because a section of the streamer is at the threshold depth. For example, during operations, the streamer array may travel through an area with strong eddy currents that may temporarily drag a portion of the streamers to the threshold depth. In such cases, it may not be desirable to trigger the streamer recovery devices because the streamers may function normally after passing through the area comprising the eddy current. Embodiments of the invention provide a smart streamer recovery device that may be programmable and or dynamically controlled and monitored, e.g., from the seismic vessel, as will be discussed below.

Referring back to FIG. 1, the streamer cables or seismic streamers 112 may include a communication network 117 (dashed line) for exchanging signals such as command signals, data signals, power, and the like between the vessel and various devices in and/or attached to the streamers 112, or between the various devices in and/or attached to the streamers 112. Exemplary command signals may include signals to control the one or more steering and/or depth control devices 114, commands to trigger or program the streamer recovery devices 116, and the like. Exemplary data signals may include, for example, status data from the devices 114 and 116, seismic data from the sensors 113, environmental data such as temperature, pressure, depth, etc. measured by one or more sensors 113 and devices 114, and the like. The devices 113, 114, and 116 may directly electrically connect to the network 117, or alternatively, in other embodiments, may wirelessly couple to the network 117.

While a hard wired network 117 is illustrated in FIG. 1, in alternative embodiments, any suitable wired or wireless type of communication network may be implemented. For example, in some embodiments, an acoustic network, electromagnetic network, wireless inductive or capacitive communications network, optical network, radio frequency based network, Bluetooth network, or the like may be used to communicate data and/or commands between the vessel and the streamer devices or between the streamer devices. In still other embodiments, a combination of wired and wireless network elements may be used to connect the various components of the seismic survey system illustrated in FIG. 1.

Figure 2:
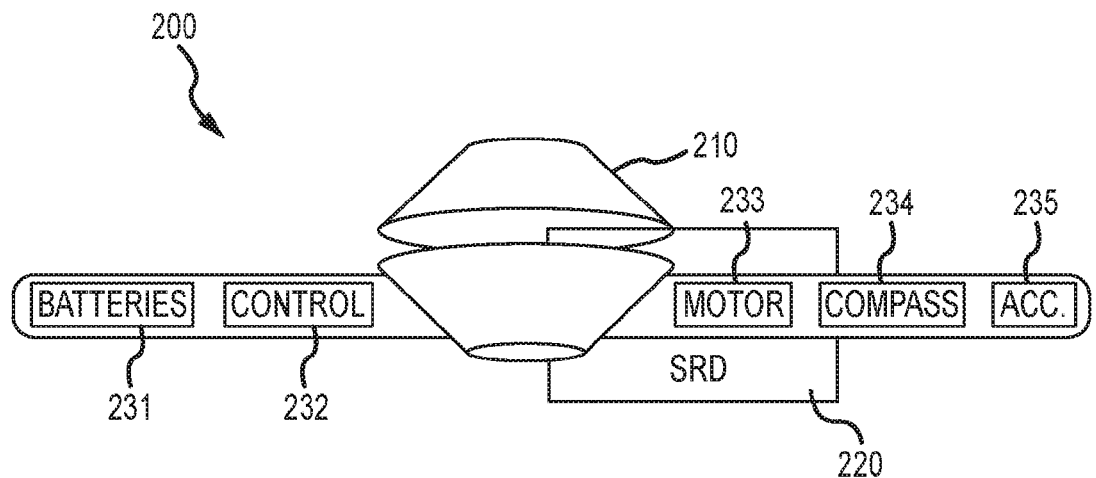
FIG. 2 illustrates an exemplary streamer device according to an embodiment of the invention.

In one embodiment of the invention, a single streamer device may be configured to perform multiple streamer related functions. FIG. 2 illustrates an exemplary streamer device 200 according to an embodiment of the invention. As shown, the streamer device 200 may include a steering and/or depth control module with one or more wings 210 (shown in schematic form), and therefore may be able to function as a steering device, specifically a depth control device as shown in FIG. 2. In alterative embodiments, the wings may be replaced with fins to make the device 200 a lateral steering device. In general, any suitable placement of wings/fins and other control surfaces to facilitate lateral and/or vertical steering of the device falls within the purview of the invention.

In one embodiment, the streamer device 200 may also be configured to operate as a streamer recovery device. Accordingly the streamer device 200 may include a streamer recovery system or module 220 that may include a compressed air can and a floatation device or positive buoyancy element that can be inflated when recovery is desired.

As further illustrated in FIG. 2, the streamer device may include a power supply or batteries 231, a control circuit 232, a motor 233, a compass 234, and an acoustic transducer 235. The batteries 231 may be any type of battery whether rechargeable or non-rechargeable, and may be configured to power the various components of the streamer device 200. A streamer device 200 or recovery module 220 may also carry its own rechargeable battery or primary battery. Alternatively, power may be transmitted wirelessly to device 200 and/or module 220, or via a wired power connection.

The motor 233 may be configured to control an angle of the wings 210 thereby facilitating steering of a streamer attached to the streamer device 200. The motor 233 may also be configured to trigger the streamer recovery module 220 in certain circumstances, thereby causing a floatation device to be inflated. In alternative embodiments, a separate motor or actuator may be provided to trigger the streamer recovery module.

Thus, an integrated device 200 may be provided in a single or combined housing, with a steering or depth control module 210 having motor actuated wings, fins or other control surfaces and a recovery module 220 with a positive buoyancy device configured to raise the streamer (or streamer section) to the surface for recovery, as described herein. In these embodiments, a single battery/power supply 231, controller 232, motor/actuator 233, compass/positional system 234, and transducer 235 may be provided to service both modules. Alternatively, or one or more of these components can be provided in dedicated form, e.g., with a motor controller system 232/233 for the wings or other control surfaces, and a separate power and/or actuator control system for the streamer recovery module 220. The depth control, steering and streamer recovery functions can also be provided via discrete devices, using a suitable communications protocol as described below.

The compass or positional system 234 may be configured to determine a bearing of the streamer device 200. The compass data may be used to calculate a position of the sensors in a streamer to which the streamer device is attached or a shape of the seismic streamer array. The compass data may also be used in the control of the steering the wings 210. The streamer device 200 may include any number of sensors to collect various types of useful survey data, for example, depth sensors, temperature sensors, salinity sensors, density sensors, and the like. In some embodiments, the streamer device 200 may also include seismic sensors such as hydrophones, geophones, accelerometers, or the like to collect seismic data.

The acoustic transducer 235 may be configured to receive and/or transmit acoustic signals to and from the seismic vessel or to/from other streamer devices. In one embodiment of the invention, the acoustic transducer 235 may communicate with the seismic vessel to determine a positon of the streamer device 200, thereby facilitating calculation of sensor positions in the seismic array, shape of the seismic array, and the like.

In one embodiment, the acoustic transducer 235 may be used to detect presence of marine mammals by measuring sounds generated by the mammals during communication, movement in the water, and the like. In some embodiments, the acoustic transducer may also be configured to generate an acoustic signal. The generated acoustic signal may be used for communicating data to the seismic vessel, designed to deter marine mammals, or for any other suitable purpose.

The control circuit 232 may control operation of various components in the streamer device 200. In one embodiment, the control circuit 232 may be configured to operate completely autonomously based on pre-programmed logic and measured data from sensors. For example, the control circuit may be configured to use depth measurements from depth sensors to adjust the wings 210 to maintain the streamer device at a predefined depth.

In some embodiments, the control circuit 232 may determine whether predefined conditions for triggering the streamer recovery module are present. Exemplary predefined conditions for triggering the streamer recovery module may include, loss of communications with the seismic vessel, loss of communications with the seismic vessel for a predefined period of time, detection of a predefined depth, persistence of a predefined depth for a predefined period of time, and the like.

In an alternative embodiment, the control circuit 232 may be configured to work in conjunction with a corresponding controller, whether a computer or a human, on the seismic vessel. For example, the control circuit may use a communications interface to communicate with the seismic vessel via communications network (e.g., the network 117 of FIG. 1). The communications may include data indicating a potential failure condition, e.g., measurement of a threshold depth. Such communications may trigger an alarm on the seismic vessel, thereby facilitating intervention and appropriate decision making by the controller on board the vessel. The control circuit 232 may also be configured to receive commands from the seismic vessel via the communication network to take a predefined action, for example, triggering the streamer recovery module.

Embodiments of the invention are not limited to the particular arrangement of functional devices in the streamer device 200, as shown in FIG. 2. In alternative embodiments, any number, any types, and any arrangement of two or more functional devices (e.g., lateral steering devices, vertical steering devices, streamer recovery devices, compasses, acoustic transducers etc.) and sensors may be included in the streamer device 200. By combining multiple functions into a single device, the total number of devices attached to the streamer may be greatly reduced, thereby reducing a cost of the seismic system. Embodiments of the invention are also not limited by the particular shapes for the streamer device illustrated herein. In general, the streamer devices may have any desired shape, and may include any number of modules that may be attached to each other to form the streamer device.

Furthermore, any combination of functional devices and sensors may be used to create a wide variety of streamer devices that may be attached to the streamers at predefined locations. In one embodiment, the streamer devices may have a modular design that may facilitate dynamic assembly of the seismic streamer devices, for example, on the seismic vessel during operations. In other words, the streamer devices may be formed by attaching desired functional modules and sensor modules to each other, and such coupling may be performed prior to a survey, or during operations based on the requirements of the survey operator.

Figure 3A:
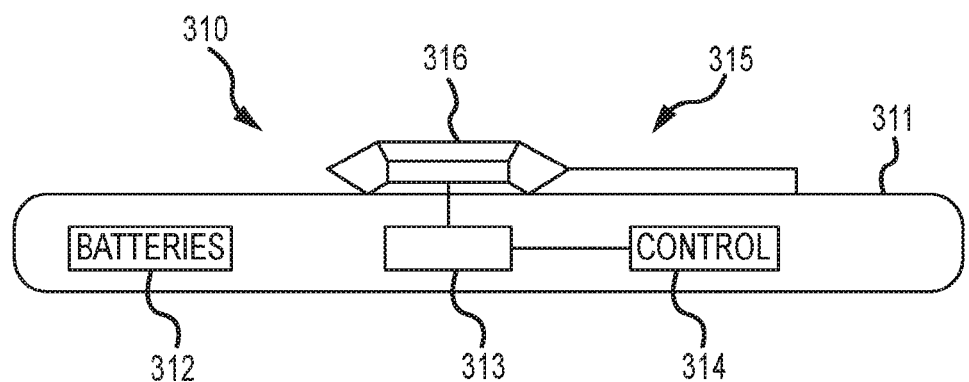
FIG. 3A illustrates a steering device.

In one embodiment of the invention, a streamer recovery device may be formed by modifying an existing steering device. FIG. 3A illustrates a conventional steering device 310. As shown, the steering device 310 includes a body or housing 311 including a power supply or battery system 312, a motor or motor/actuator 313, and a control circuit 314. A detachable wing module 315 including wings 316 (shown in schematic form) are attached to the body 311 such that the motor/actuator 313 is attached to and configured to control an angle of the wings 316 of the wing module 315.

Figure 3B:
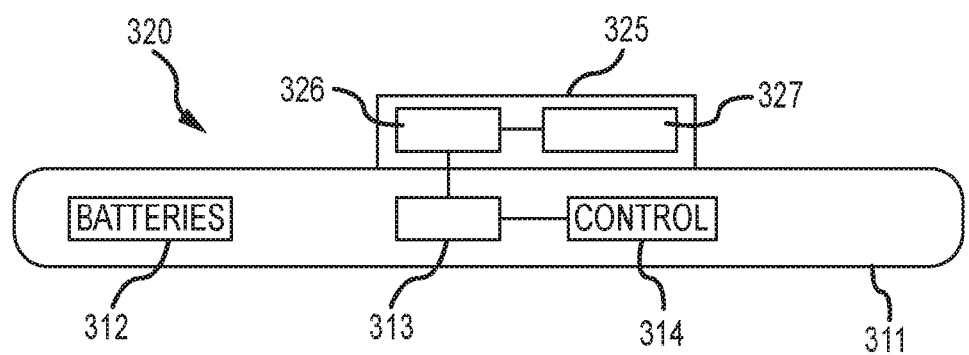
FIG. 3B shows an embodiment with a streamer recovery module.

In one embodiment, the wings 316 or the entire wing module 315 may be removed and replaced with a streamer recovery module, as shown in FIG. 3B. As with the streamer device 310 of FIG. 3A, the streamer device 320 of FIG. 3B also includes the same body 311 comprising a power supply or batteries 312, a motor 313, and a control circuit 314. However, the wing module 315 of FIG. 3A is replaced with a streamer recovery module or device 325.

The streamer recovery module 325 is attached to the body 311 such that the motor or actuator 313 is coupled to and configured to activate a compressed air can or similar gas reservoir 326 of the streamer recovery module 325. Upon activation by the motor, the compressed air can or reservoir 326 will inflate a floatation device 327, or actuate a similar positive buoyancy element 327. When a steering device is converted to a streamer recovery device as described herein, the control circuit 314 may be reprogrammed to operate the streamer device 320 as a streamer recovery device as described herein.

In these embodiments, both wired and wireless communications can take place between the steering or depth controller 310 with wing/control surface module 315 and the streamer device 320 with recovery module 325, such that depth monitoring, control, and activation decisions can be performed using the controller 314 of the steering/depth control device 310, using an activation signal communicated wirelessly by inductive or capacitive components (or other wired or wireless systems) to the recovery module 325 on streamer device 320. Power can be transmitted wirelessly or via a wired connection, or the recovery device 320 can carry its own rechargeable battery or primary battery 312, as described above.

Status such as the readiness of recovery module 325 and gas pressure in actuator/reservoir 326 can be transmitted to the steering device/depth controller 310 for transmission back to the user shipboard (e.g., over a wired or wireless network), or streamer device 320 can be provided with a suitable interface or transceiver system to communicate data over the network.

Alternatively, an integrated recovery/steering device can include both a steering module and a recovery module within a single combined housing. In these embodiments, the integrated device may utilize the same or separate motor/actuator and controller subsystems for the steering and recovery functions, as described above.

The streamer device 320 may include any number of other functional devices and/or sensors (e.g., the devices and sensors described with respect to FIG. 2 above). Furthermore, the streamer recovery devices described herein may additionally include memory devices and other electronic circuits necessary to facilitate operation of the streamer devices.

Referring back to FIG. 1, any one or more of the streamer devices described herein with respect to FIGS. 2, 3A-B may be attached to the streamers 112. Furthermore, embodiments of the invention are not limited by the specific shapes of the streamer devices and relative configuration and/or positioning of the streamer devices along the streamers.

For example, in one embodiment, the streamer devices may be separate and distinct from the streamers 112 and configured to attach to the streamers via an attachment device or devices, for example, collars that are connected to the streamer devices and configured to wrap around the streamer. In alternative embodiments, the streamer devices may be shaped such that a passage is defined in the streamer device body for receiving the streamer. In still other embodiments, the streamer devices may be configured connect two streamer segments, and be positioned in line with the streamer.

Regardless of the shape, position, and connection mechanism, the streamer devices may be configured to communicate data, status, and the like with the seismic vessel via the communications network, and be controlled by the seismic vessel. Control of the seismic streamer devices may include programming or reprogramming the streamer devices during operation, triggering a function (e.g. streamer recovery) of the streamer device, setting/adjusting a threshold depth for activation, and the like.

In one embodiment of the invention, the seismic vessel may be configured to monitor the status of the seismic streamer array as a whole using the data received from the various streamer devices. In one embodiment, the seismic vessel may be configured to selectively trigger one or more streamer devices equipped with a streamer recovery function based on determining that a catastrophic event is likely to occur, or is occurring.

For example, in one embodiment, if streamer devices in one part of the streamer array indicate that they are sinking, the seismic vessel may proactively trigger one or more streamer recovery devices in other parts of the seismic array to initiate recovery. Such proactive actions may prevent the entire array from sinking, and potentially getting caught in deep currents that may sweep the array and any detached streamers to locations where they may be difficult to locate for recovery.

In another embodiment, the seismic vessel may proactively signal streamer recovery devices to activate if the seismic vessel loses power and begins to slow down rapidly. In such situations, it is possible that the momentum of the seismic array will carry the streamers under the vessels and into the vessel rudder, which may damage the streamers. Therefore, by activating the streamer recovery devices and causing the streamers to surface, damaging the streamers may be avoided.

As discussed above, proactive triggering of recovery devices may be done selectively such that an intended goal of preventing a catastrophic condition is avoided. In other words, not all streamer recovery devices may be triggered at the same time. The vessel operator or computer may determine specific streamer recovery devices at specific locations that will maximize the likelihood of an intended result and selectively signal the specific streamer recovery devices to activate.

While centralized control of streamer devices via the vessel is disclosed herein, in alternative embodiments, streamer devices may be configured to communicate directly with one another and control respective functionality. In one embodiment, if communications with the seismic vessel are lost, streamer devices may communicate with each other via an available communication network to coordinate an action that facilitates recovery of the streamer.

For example, if a streamer detaches and loses communication from the vessel, and a first end of the streamer begins to sink, streamer recovery devices at the first end may communicate to streamer recovery devices at the other end or along other portions of the streamer to proactively activate and facilitate streamer recovery. In some embodiments, the streamer devices may also communicate to each other to adjust an angle of steering devices to facilitate efficient travel through the water column towards to sea surface. The streamer devices may also communicate with each other to share power, share sensor data that may not be available at all the streamer devices, and the like.

Figure 4:
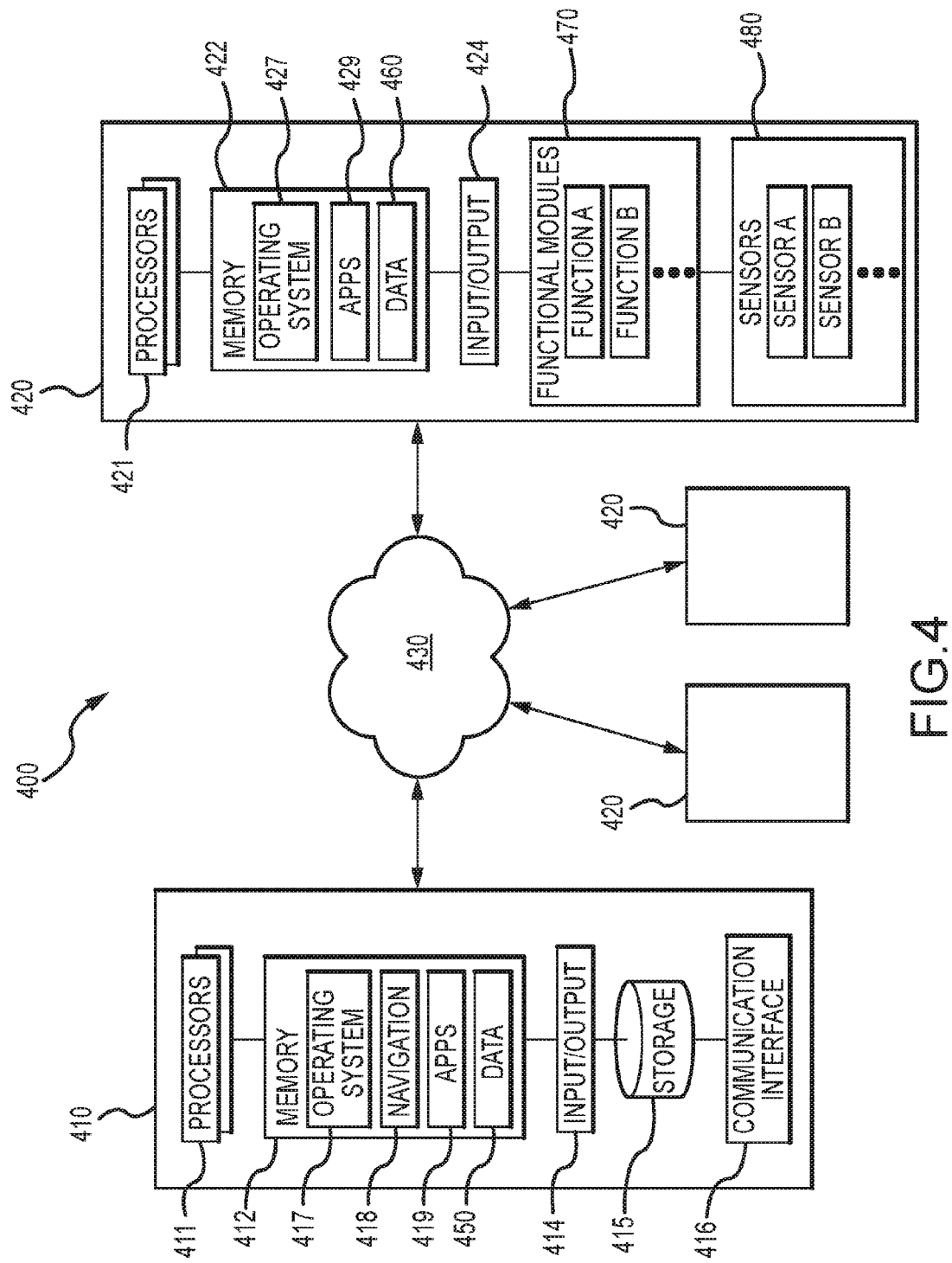
FIG. 4 illustrates an exemplary control system according to an embodiment of the invention.

FIG. 4 illustrates an exemplary control system 400 according to an embodiment of the invention. The control system 400 may be configured to control a plurality of streamer recovery devices as described herein. As illustrated in FIG. 4, the control system 400 may include a vessel computer 410 and a plurality of streamer recovery devices (or streamer devices) 420 connected by a communications network 430. The vessel computer 410 may include one or more processors 411, a memory 412, input/output devices 414, storage 415, and a communications interface 416.

The input/output devices 414 may include input devices such as a mouse, keyboard, touchscreens, and the like, and output devices such as CRT monitors, LCD displays, tablet computers, and the like. The input devices may be configured to receive input from a vessel operator including commands to the streamer devices 420. Storage device 415 stores application programs and data for use by the control system 400.

Typical storage devices include hard-disk drives, flash memory devices, optical media, network and virtual storage devices, and the like. The communications interface 416 may connect the vessel computer 410 to the communications network 430 which may include wired networks, wireless networks, or a combination thereof as described above.

The memory 412 is preferably a random access memory sufficiently large to hold the necessary programming and data structures of the invention. While memory 412 is shown as a single entity, it should be understood that memory 412 may in fact comprise a plurality of modules, and that memory 412 may exist at multiple levels, from high speed registers and caches to lower speed but larger DRAM chips.

Illustratively, the memory 412 contains an operating system 417. Well known examples of operating systems include the Windows® operating system, distributions of the Linux® operating system, and IBM's AIX and OS/2® operating systems, among others. More generally, any operating system supporting the functions disclosed herein may be used.

Memory 412 is also shown containing a navigation program 418 which, when executed by the processor(s) 411, provides support for coordinating operation of streamer devices during a seismic survey. For example, in one embodiment, the navigation software may facilitate programming/reprogramming of streamer recovery devices, steering devices, and the like. To facilitate such control, the navigation program 418 may be configured to generate alarms or otherwise prompt input from a survey operator as discussed herein. Memory 412 may also contain applications 419 and survey data 450. The applications 419 may define control logic for operating the seismic streamer devices. Survey data 450 may include data regarding, for example, status, position and the like of various streamer devices.

The streamer devices 420 may include processors 421, memory 422, operating system 427, and input/output devices 424, that may be similar to the processors 411, memory 412, operating system 417 and input/output devices 414 described with respect to the vessel computer 410. The memory 422 of the streamer devices may include applications 429 and data 460. The application 429 may include control logic for controlling one or more of the functional modules 470, for example, a streamer recovery module, steering module, and the like. The applications 429 may also be configured to monitor the sensors 480 and store the sensor data as the data 460.

As described above, in one embodiment, the applications 429 may be configured to operate in coordination with the navigation software 418 or applications 419 by communicating data/status with the vessel computer 410 using the input output devices 424 and the network 430. The applications may be configured to receive commands from the vessel computer 410 via the network, wherein the commands may influence operation of the functional modules 470 or program/reprogram the logic in the applications 429. In alternative embodiments, the applications 429 may be configured to autonomously operate the streamer device or one or more functional modules associated therewith without input from the vessel computer 410.

In one embodiment, the applications 429 of a first streamer device 420 may be configured to communicate and co-ordinate operation with applications 429 of another one or more streamer devices 420 via the network 430, as described hereinabove.

EXAMPLES

Various systems and methods are provided for retrieving seismic streamers which become severed from the towing vessel. Streamer recovery can be remotely activated to cause the streamers to surface where they are more easily retrieved.

In these various examples and embodiments, a streamer recovery device is provided as described herein. Additional embodiments include one or more seismic streamers, each comprising at least such one streamer recovery device, and methods and systems for recovering one or more streamers provided with the streamer recovery device. A non-transitory computer-readable data storage medium can also be provided with program code stored thereon, where the program code is executable on a computer processor to operate such a system or to perform such a method, for recovering one or more streamers using one or more streamer recovery devices.

Suitable seismic streamer devices include a recovery module and are configured for coupling to a seismic streamer towable in a water column, where the recovery module comprising an actuator coupled to a floatation device or positive buoyancy element. A module controller or control processor can be configured to trigger the actuator, in order to deploy the device in response to determining that a particular (e.g., predetermined or real-time) recovery condition is met.

The recovery module is configured to raise at least a portion of the seismic streamer to a surface of the water column, when the positive buoyancy element is deployed. Alternatively, the device may be deployed when one or more such conditions are met, either simultaneously or in a particular sequence, e.g., loss of communications followed by a depth signal and/or drift signal, indicating that the streamer device has been detached from the tow vessel or there has been some other systemic failure.

Depending upon application, the actuator can comprise a compressed gas or fluid reservoir configured to inflate the positive buoyancy element when triggered by the controller. Alternatively, an ignitor or similar trigger mechanism can be used to initiate a chemical reaction that emits the gas, resulting in deployment of the positive buoyancy element. Other suitable trigger and actuation mechanisms can be used to deploy similar floatation devices.

In integrated seismic recovery and steering device embodiments, the seismic streamer device includes a steering module. The steering module includes at least one wing, fin or other control surface configured to steer the seismic streamer to a selected lateral position and/or depth with respect to the surface of the water column. A motor can be included to position the control surface, using either the same local on-board device control processor, or a separate steering motor controller. Additional components can include a battery or power supply and a compass or positioning system configured to determine one or more of the position, speed, depth and direction of the seismic streamer device (and the associated section of the seismic streamer, to which the device is coupled).

The recovery condition may include or be indicated by loss of communications between the controller and a remote system control computer on the vessel towing the seismic streamer through the water column, on another seismic vessel used in the survey, or in a another remote location. For example, recovery can be triggered by an instantaneous loss of communications with the remote computer, or by a loss of communications that persists for a predetermined period of time. Suitable predetermined periods for loss of communications (and other recovery indicators) vary from application to application, for example from more than five or ten minutes to more than an hour, indicating that the streamer has been severed or that the communications network has otherwise failed or been compromised. Alternatively, the predetermined time may be somewhat less or somewhat more, for example two hours, several hours, or a day, or more.

The seismic streamer device can utilize a depth signal for detection of a predefined depth of the seismic streamer below the surface of the water column, either using a pressure sensor on the device itself, or on one or more of the seismic sensors distributed along the seismic streamer. In these applications, the recovery condition may be met by the predefined depth signal persisting for a predetermined period of time, indicating that the streamer (or section thereof) is at or below the predetermined depth. The device can also include a speed sensor or positional system (e.g., a GPS or other navigational system) configured for determining a position or tow speed of the seismic streamer with respect to the water column, where the recovery condition is met by a drift signal indicating loss of the tow speed for a predetermined period of time.

Thus, the recovery condition may include or be indicated by a predefined depth signal, a position of the streamer outside a predetermined survey area, and/or a loss of towing speed or drift signal, each of which may persist for a predetermined period of time. Alternatively, the depth, position, and/or speed signals may be substantially real-time or instantaneous, or they may occur in a predetermined sequence. For example, loss of communications may indicate that a seismic streamer (or portion thereof) has been severed or detached from the tow vessel, with subsequent depth or loss of tow speed signals indicating that the streamer section has started to sink or drift.

In additional examples, the seismic streamer device includes a receiver or transceiver system configured for receiving a remote recovery signal, with the remote signal coming from a system control computer to indicate that the recovery condition has been met. A transmitter or transceiver system can also be provided to relay such remote recovery signals to other seismic streamer devices, whether the recovery signal is generated by the remote system controller, or by one of the individual streamer devices.

For example, acoustic "peer-to-peer" transceiver systems can be provided to communicate recovery signals among a number of recovery modules or seismic streamer devices distributed along the same streamer cable, or on different streamer cables in a towed streamer array. Alternatively, any combination of acoustic, electromagnetic, hard-wired, optical, radio frequency, Bluetooth network and similar wired or wireless network components can be used to transmit depth, positional, speed, and recovery signal data between the individual seismic streamer devices, and/or between the seismic streamer devices and a remote seismic survey controller on the tow vessel, or in other remote location.

In some applications, the data can be transmitted over the network to a remote computer or system controller, in order to determine whether to issue streamer recovery commands for broadcasting to selected seismic streamer devices on one or more towed streamer cables. For example, the system controller could issue recovery commands to selected devices located past the location where a particular streamer cable had been severed, or to all the devices on a detached streamer cable. Alternatively, the system controller could issue a global recovery signal to all the devices. Individual seismic streamer devices can also be provided with transceivers configured for selected peer-to-peer communication of the data, indicating that the recovery condition had been meet by one or more of the individual devices.

Apparatus embodiments include one or more seismic streamers, each having a plurality of seismic sensors configured for deployment in a water column. At least one recovery module is disposed along each seismic streamer, each module comprising an actuator coupled to a positive buoyancy device and a controller configured to trigger the actuator to deploy the positive buoyancy device in response to a recovery condition. The positive buoyancy device is configured to raise at least a portion of the respective seismic streamer to a surface of the water column, when the recovery condition is met.

The seismic sensors can include one or more of a hydrophone, a geophone, and a particle motion sensor, or a combination thereof. The seismic sensors generate a combination of the data signals including seismic data, temperature data, pressure data, and depth data, which can be communicated with a remote control computer via a network, or among the individual streamer devices.

For example, each recovery module can include a transceiver configured for communicating data signals from the seismic sensors over a network in communication with a remotely located seismic system control computer, where the data signals include one or more of seismic data, temperature data, pressure data, and depth data, as described above. The transceiver can also be configured for receiving a recovery signal from the system control computer over the network, where the recovery signal indicates that the recovery condition is met, either based on the transmitted data itself, or in response to a corresponding signal from another one of the recovery modules.

The recovery condition can also be met by the loss of communications with the remotely located system control computer, for example after a predetermined period of time, or in a predetermined sequence or combination with other indicators such as a persistent depth signal or drift (loss of tow speed) signal. For example, the recovery condition can be met by a drift signal or by the pressure data indicating at least a portion of one of seismic streamers has reached a predefined depth (or is below that depth), and such a signal may persists for a predetermined period of time, after the loss of network communications, or in the absence of such communications with the remote seismic system control computer.

The recovery modules can include both a transmitter or transceiver configured for generating a remote recovery signal indicating that the recovery condition is met, and a receiver or transceiver configured for receiving a remote recovery signal from either the system control computer or another recovery module, where in response, the module controller triggers the actuator to deploy the positive buoyancy device. The communication of the recovery signals can be selective, e.g., based on communication along a particular contiguous streamer segment, or using coded recovery module (or seismic streamer device) identification data. Thus, either a global or localized recovery signal can be used, depending upon whether the data indicate a local failure along a particular streamer segment, failure of an entire streamer cable, or a more systemic problem (e.g., complete loss of communications with the tow ship for an entire seismic array, or for substantial portions of the array).

Each recovery module can also include a steering system with one or more control surfaces actuated to steer the respective seismic streamer to a selected depth or position, with respect to the surface of the water column. In some examples, the steering and recovery components can be combined into a single device, with a substantially unitary housing.

The actuator itself can utilize a gas reservoir configured to inflate the positive buoyancy device when triggered by the controller. The gas reservoir, controller and steering system can also sharing a common housing with the compass or positioning system.

Seismic survey system embodiments include one or more seismic streamers configured for deploying a plurality of seismic sensors in a water column. One or more streamer devices are disposed along each seismic streamer, each device comprising an actuator coupled to a positive buoyancy module with a controller configured to trigger the actuator in response to a recovery condition. The positive buoyancy module deploys to raise at least a portion of the seismic streamer to a surface of the water column, when the recovery condition is met.

A system controller is provided in communication with the streamer devices disposed along each seismic streamer. The system controller is configured to communicate data with the streamer devices as described above, and to determine whether the recovery condition is met.

For example, the system controller can be configured to selectively signal the streamer devices disposed along each seismic streamer in response to the recovery condition being met for a single streamer device, where a plurality of the selected module controllers trigger the respective positive buoyancy modules to raise the corresponding portions of the seismic streamers. The module controllers in each streamer device can also be configured to determine whether the recovery condition is met in an independent fashion, for example either in the absence of, or in response to loss of communication with the system controller.

Each of the streamer devices can include a transceiver configured to communicate data indicative of the recovery condition being met with others of the streamer devices. The other devices can be selected based on location along a particular streamer cable or streamer segment, as described above, or using a global signal indicating that all the corresponding module controllers should trigger their respective actuators, absent other communications with the system controller.

In integrated embodiments, each of the streamer devices comprises a steering module configured to control a depth or position of the respective seismic streamer with respect to the surface of the water column. Thus, the recovery module can either replace the steering module in a standard "bird" or similar device, or the steering and recovery module subsystems can be combined into a single housing.

Methods of operating the seismic systems are also included, as described herein. In addition, computer-readable storage media can be provided with program code executable on a processor in order to perform the methods, and to operate the corresponding systems.

While this invention is described with respect to exemplary embodiments, it is understood that changes can be made and equivalents may be substituted to adapt the disclosure to different materials, problems and situations, while remaining within the spirit and scope of the invention. The invention is thus not limited to the particular examples that are described, but encompasses all the embodiments that fall within the scope of the appended claims.

While the foregoing is thus directed to embodiments of the present invention, other and further embodiments of the invention may be devised without departing from the basic scope thereof, and the scope thereof is determined by the claims that follow.

The invention claimed is:

1. A seismic streamer system comprising:
a recovery module configured for coupling to a seismic streamer deployed in a water column, the recovery module comprising:
an actuator coupled to a positive buoyancy element;
a controller configured to trigger the actuator to deploy the positive buoyancy element in response to a recovery condition being met; and
an interface configured for receiving an external recovery signal indicating that the recovery condition is met;
a steering or depth control device coupled to the seismic streamer, the steering or depth control device configured to generate the external recovery signal, wherein the interface is configured to receive the external control signal generated by the steering or depth control device wirelessly via an inductive or capacitive signal, or a combination thereof;
wherein the positive buoyancy element is configured to raise at least a portion of the seismic streamer to a surface of the water column, when the recovery condition is met.

2. The system of claim 1, further comprising the steering or depth control device having at least one wing, fin or other control surface configured to steer the seismic streamer to a selected position or depth with respect to a surface of the water column.

3. The system of claim 2, wherein the actuator comprises a gas reservoir configured to inflate the positive buoyancy element when triggered by the controller.

4. The system of claim 1, wherein the interface is communicatively coupled to a control computer configured to communicate such an external recovery signal to the seismic streamer device via a network comprising one or more of an acoustic network, an electromagnetic network, an optical network, a radio frequency based network, and a Bluetooth network.

5. The system of claim 1, wherein the recovery condition being met comprises loss of communications between the controller and a network in communication with a seismic vessel towing the seismic streamer through the water column, the loss of communications persisting for a predetermined period of time.

6. The system of claim 1, wherein the recovery condition being met comprises a pressure signal indicating at least a selected depth of the seismic streamer or a portion thereof below a surface of the water column, the pressure signal persisting for a predetermined period of time.

7. The system of claim 1, further comprising a transmitter or transceiver configured to generate a remote recovery signal for communication to other such seismic streamer systems, when the recovery condition is met.

8. The system of claim 1, wherein the recovery condition being met comprises a drift signal indicating substantial loss of tow speed of the seismic streamer with respect to the water column, for a predetermined period of time after loss of network communications with a remote seismic system control computer.

9. The system of claim 1, wherein the recovery module is attached to a body of the steering or depth control device.

10. The system of claim 9, wherein the system is dynamically controlled by programming during operation to set a threshold depth for activation.

11. A seismic streamer apparatus comprising:
one or more seismic streamers, each seismic streamer having a plurality of seismic sensors configured for deployment in a water column;
at least one recovery module disposed along each seismic streamer, each recovery module comprising:
an actuator coupled to a positive buoyancy device and a controller configured to trigger the actuator to deploy the positive buoyancy device in response to a recovery condition being met; and
a transceiver configured for receiving an external recovery signal indicating that the recovery condition is met
a steering or depth control module coupled to one or more of the seismic streamers and in data communication at least one respective recovery module, the steering or depth control module configured to determine whether the recovery condition is met, wherein the steering or depth control module and the respective recovery module are in wireless data communication via an inductive or capacitive signal, or a combination thereof;
wherein the positive buoyancy device is configured to raise at least a portion of the respective seismic streamer to a surface of the water column, when the recovery condition is met.

12. The apparatus of claim 11, wherein the recovery condition is met by loss of communications with a remote processor for a predetermined period of time.

13. The apparatus of claim 11, wherein the transceiver is further configured for communicating data signals over a network, the data signals including one or more of seismic data, temperature data, pressure data, and depth data.

14. The apparatus of claim 13, wherein the recovery condition is met by pressure data indicating that a corresponding one of the seismic streamers is at or below a selected depth, for a predetermined period of time after loss of communications with the network.

15. The apparatus of claim 11, each recovery module comprising:
the transceiver configured for generating a remote recovery signal indicating that the recovery condition is met; and
a receiver or transceiver configured for receiving such a remote recovery signal from another such recovery module, wherein the controller triggers the actuator to deploy the positive buoyancy device.

16. The apparatus of claim 11, wherein each steering or depth control module comprises a steering system with one or more control surfaces actuated to steer the respective seismic streamer to a selected depth or position with respect to the surface of the water column.

17. The seismic streamer apparatus of claim 11, wherein the recovery condition being met comprises a drift signal indicating substantial loss of tow speed of the seismic streamer with respect to the water column, for a predetermined period of time after loss of network communications with a remote seismic system control computer.

18. The seismic streamer apparatus of claim 11, wherein each recovery module is attached to a body of a respective steering or depth control device.

19. The seismic streamer apparatus of claim 18, further comprising a controller of the steering or depth control device configured for using an activation signal communicated wirelessly by inductive or capacitive components to the recovery module.

20. A marine seismic survey system comprising:
one or more seismic streamers configured for deploying a plurality of seismic sensors in a water column;
one or more streamer devices disposed along each seismic streamer, each streamer device comprising an actuator coupled to a positive buoyancy module with a module controller configured to trigger the actuator in response to a recovery condition being met, wherein the positive buoyancy module deploys to raise at least a portion of the seismic streamer to a surface of the water column when the recovery condition is met; and
a system controller in data communication with at least one of the respective streamer devices disposed along each seismic streamer, wherein the system controller is configured to determine whether the recovery condition is met in response to loss of communications between the controller and a network in communication with a seismic vessel towing the one or more seismic streamers through the water column and a drift signal indicating substantial loss of tow speed of the respective seismic streamer through the water column, for a predetermined period of time.

21. The system of claim 20, wherein the system controller is configured to selectively signal the streamer devices disposed along each seismic streamer in response to the recovery condition being met, wherein some of the module controllers trigger the respective positive buoyancy modules to raise the corresponding portions of one or more of the seismic streamers to the surface of the water column and others of the module controllers do not.

22. The system of claim 20, wherein the module controller in each streamer device is configured to determine whether the recovery condition is met in response to loss of the communication with the system controller, wherein each of the streamer devices comprises a transceiver configured to communicate data indicative of the recovery condition being met with others of the streamer devices.

23. The system of claim 20, wherein each of the streamer devices comprises a steering module configured to control a depth or position of the respective seismic streamer with respect to the surface of the water column.

24. A method of operating the system of claim 20, the method comprising:
- deploying the one or more seismic streamer in the water column;
- triggering at least one of the actuators to deploy a respective positive buoyancy module, in response to the recovery condition being met; and
- recovering the corresponding seismic streamer, or a portion thereof.

25. The marine seismic survey system of claim 20, wherein each streamer device comprises a transceiver configured for receiving an external recovery signal indicating that the recovery condition is met.

26. The marine seismic survey system of claim 25, wherein the one or more streamer devices are dynamically controlled by programming during operation to set a threshold depth for activation.

\* \* \* \* \*